(12) United States Patent
Peters

(10) Patent No.: US 12,221,108 B2
(45) Date of Patent: Feb. 11, 2025

(54) OVERTAKE FOR AN AUTOMATIC CRUISE CONTROL

(71) Applicant: Robert Bosch GmbH, Stuttgart (DE)

(72) Inventor: Matthew David Peters, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 17/823,903

(22) Filed: Aug. 31, 2022

(65) Prior Publication Data

US 2024/0067178 A1 Feb. 29, 2024

(51) Int. Cl.
| | |
|---|---|
| *B60W 30/18* | (2012.01) |
| *B62J 45/20* | (2020.01) |
| *B62J 45/41* | (2020.01) |
| *B62K 23/02* | (2006.01) |

(52) U.S. Cl.
CPC ... *B60W 30/18163* (2013.01); *B60W 2300/36* (2013.01); *B60W 2420/408* (2024.01); *B60W 2520/10* (2013.01); *B60W 2540/20* (2013.01); *B60W 2554/4041* (2020.02); *B60W 2554/4042* (2020.02); *B60W 2720/106* (2013.01); *B62J 45/20* (2020.02); *B62J 45/41* (2020.02); *B62K 23/02* (2013.01)

(58) Field of Classification Search
CPC ... B60W 30/18163; B60W 2554/4041; B60W 2554/4042; B60W 2420/408; B60W 2300/36; B60W 2520/10; B60W 2540/20; B60W 2720/106; B62J 45/20; B62J 45/41; B62K 23/02
See application file for complete search history.

(56) References Cited

U.S. PATENT DOCUMENTS

| | | | |
|---|---|---|---|
| 6,876,300 | B2 | 4/2005 | Ponziani |
| 9,650,044 | B2 | 5/2017 | Kim |
| 10,814,913 | B2 | 10/2020 | Fujii |
| 10,882,523 | B2 | 1/2021 | Knitt |
| 2009/0321229 | A1 | 12/2009 | Haug |
| 2018/0057002 | A1 | 3/2018 | Lee et al. |
| 2020/0130690 | A1 | 4/2020 | Chow |
| 2021/0107510 | A1 | 4/2021 | Kato et al. |

*Primary Examiner* — Michael D Lang
(74) *Attorney, Agent, or Firm* — Michael Best & Friedrich LLP

(57) ABSTRACT

An automatic cruise control system on a motorcycle capable of performing an overtake maneuver via a long button press. The automatic cruise control includes a radar, a button, and a motorcycle speed. The radar is configured to detect objects in front of the motorcycle and generate data regarding the detected object. The button is configured to generate a button signal. The radar is further configured to receive the motorcycle speed, sensor data, and a button signal, and to generate an acceleration signal based upon the sensor data, the button signal, and the motorcycle speed.

20 Claims, 4 Drawing Sheets

OVERTAKE FOR AN AUTOMATIC CRUISE CONTROL

FIELD

Embodiments described herein relate to a system of automatic cruise control for a motorcycle.

SUMMARY

Automatic cruise control systems are present on many vehicles, such as motorcycles. One aspect of an automatic cruise control system is the determination of objects in front of the vehicle. Some automatic cruise control systems perform automatic control of vehicle acceleration to maintain a specified distance or time gap between the detected object and the vehicle. It may be desirable for the vehicle to overtake the detected object. Therefore, embodiments described herein provide, among other things, systems and methods for the automatic cruise control of a vehicle to perform an overtake maneuver.

In some embodiments, the system of automatic cruise control for a motorcycle includes a radar configured to detect an object in front of the motorcycle and a button for the motorcycle configured to generate a signal. The radar includes an electronic processor configured to receive the sensor data, determine a speed of the detected object using the sensor data, and receive a speed of the motorcycle. The electronic processor is further configured to determine overtake requests by receiving the signal from the button of the motorcycle, determine that the signal is an overtake request signal based upon a characteristic of the signal, and determine an overtake cancellation condition. The electronic processor is further configured to perform overtake maneuver by increasing a follow object control acceleration request value in response to the overtake request, and in response to the determined overtake cancelation condition, the electronic processor cancels the overtake maneuver.

In some embodiments, the radar system for a motorcycle includes a radar configured to detect vehicle in front of the motorcycle and to generate sensor data, a left turn indicator button for the motorcycle configured to generate a signal, and an electronic processor. The electronic processor is configured to receive sensor data from the radar, determine a speed of the detected vehicle using the sensor data, and receive a speed of the motorcycle. The electronic processor is further configured to receive the signal from the left turn indicator button of the motorcycle, determine that the signal is an overtake request based upon the signal having a duration greater than or equal to 2 seconds, and determine an overtake cancellation condition. The electronic processor is further configured to perform an overtake maneuver by increasing a follow object control acceleration request value in response to the overtake request, and in response to the determined overtake cancelation condition, the electronic processor cancels the overtake maneuver.

Some embodiments provide a method of overtake for an automatic cruise control of a motorcycle. The method includes detecting an object in front of the motorcycle, receiving a speed of the motorcycle, and receiving a signal sent by a button of the motorcycle. The method further includes determining that the signal is an overtake request, performing an overtake maneuver by increasing a follow object control value, and determining an overtake cancellation condition. The method further includes canceling the performance of the overtake maneuver based upon the determined overtake cancellation condition.

Other aspects, features, and embodiments will become apparent by consideration of the detailed description and accompanying drawings.

DETAILED DESCRIPTION

Figure 1:
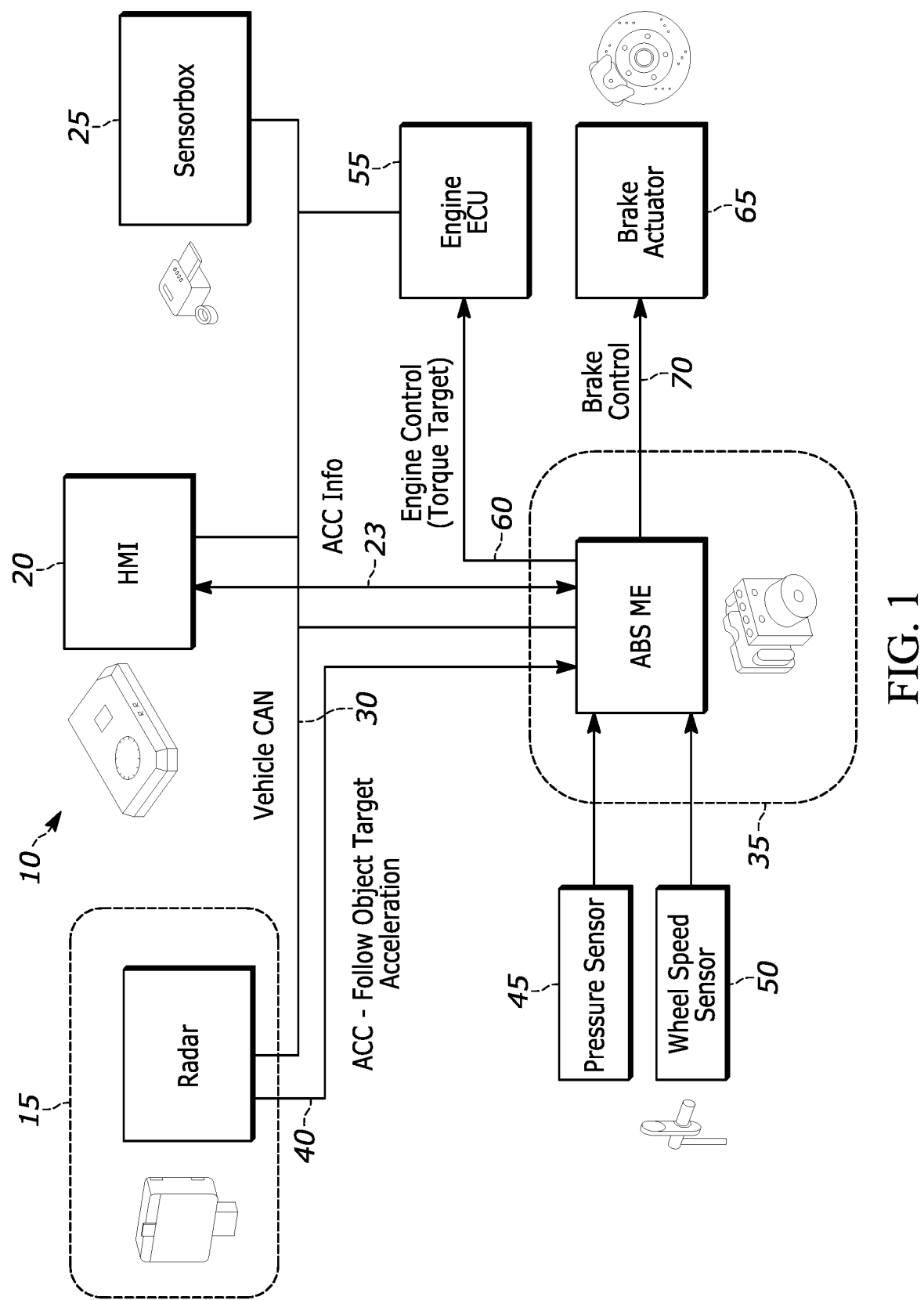
FIG. 1 is an illustration of a system of automatic cruise control for a motorcycle, according to some aspects.

FIG. 1 is an illustration of a system 10 of automatic cruise control for a vehicle, which in the example provided is a motorcycle. The system 10 includes a radar 15. In some instances, radar 15 is, for example, a headway sensor, a radar sensor, a lidar sensor, an image sensor, or another type of sensor capable of detecting an object. In some examples, the radar 15 is a forward-facing radar sensor mounted to the front of a motorcycle. For example, radar 15 is configured as a forward-facing radar sensor used for object detection and target selection during automatic cruise control. In this instance, radar 15 is also used as a follow object controller. While reference is made to a "radar" or a "radar sensor," it should be understood that in some instances the "radar" or "radar sensor" includes both sensing components and processing components (for example, a microprocessor) and, as a consequence, the radar or radar sensor processes raw information or data, for example, received radar echoes, and generates determinations, for example, information regarding detected objects. In general, whenever the term sensor is used it should be understood that the sensor may include both sensing and processing components and may be configured to generate data in particular formats, determinations regarding sensed phenomena, or other processed outputs.

The system 10 also includes a human machine interface (HMI), sometimes referred to as HMI 20. HMI 20 is configured to display information relevant to the operation of the motorcycle and configuration of the automatic cruise control, for example automatic cruise control information 23. System 10 includes a sensorbox 25 that provides additional inertial measurement information related to the motorcycle, for example, roll angle, yaw angle, pitch angle, and their derivatives, and the like. In some cases, the inertial measurement data is obtained directly from the sensorbox 25, from sensors and, in other cases, the data is obtained from other vehicle systems. This information is used for refinement of control and safety systems functions.

The system 10 also includes a vehicle CAN bus 30 that connects the radar 15, HMI 20, and sensorbox 25 to each other and to other systems and, in the example shown, connects these components to an antilock brake system (ABS) controller, sometimes referred to as ABS controller 35. In some instances, radar 15 provides automatic cruise control follow object target acceleration data 40 via the vehicle CAN bus 30. In one example, during operation of the system 10, a follow object in front of the motorcycle is selected, and acceleration data to maintain a target follow distance or time gap is sent from radar 15 to the ABS controller 35. In some examples, the ABS controller 35 is also configured to receive data from pressure sensor 45 and wheel speed data from wheel speed sensor 50. System 10 includes an engine control unit 55, sometimes referred to as an engine ECU. In some examples, the ABS controller 35 communicates with the engine control unit 55 via the vehicle CAN bus 30. In one example, the ABS controller 35 sends engine control torque data 60 to the engine control unit 55 to control the engine of the motorcycle. The ABS controller 35 is also connected to a brake actuator 65. In some instances, the ABS controller 35 receives a positive acceleration request. In this instance, the ABS controller 35 communicates the positive acceleration request to the ECU to increase speed. In some instances, the ABS controller 35 receives a negative acceleration request. In this instance, the ABS controller 35 may attempt to achieve deceleration via a reduction in rider throttle request and engine braking/natural deceleration. In other instances, the ABS controller 35 may attempt to achieve deceleration by determining how much pressure to add in order to slow the vehicle to the appropriate level of deceleration.

Figure 2:
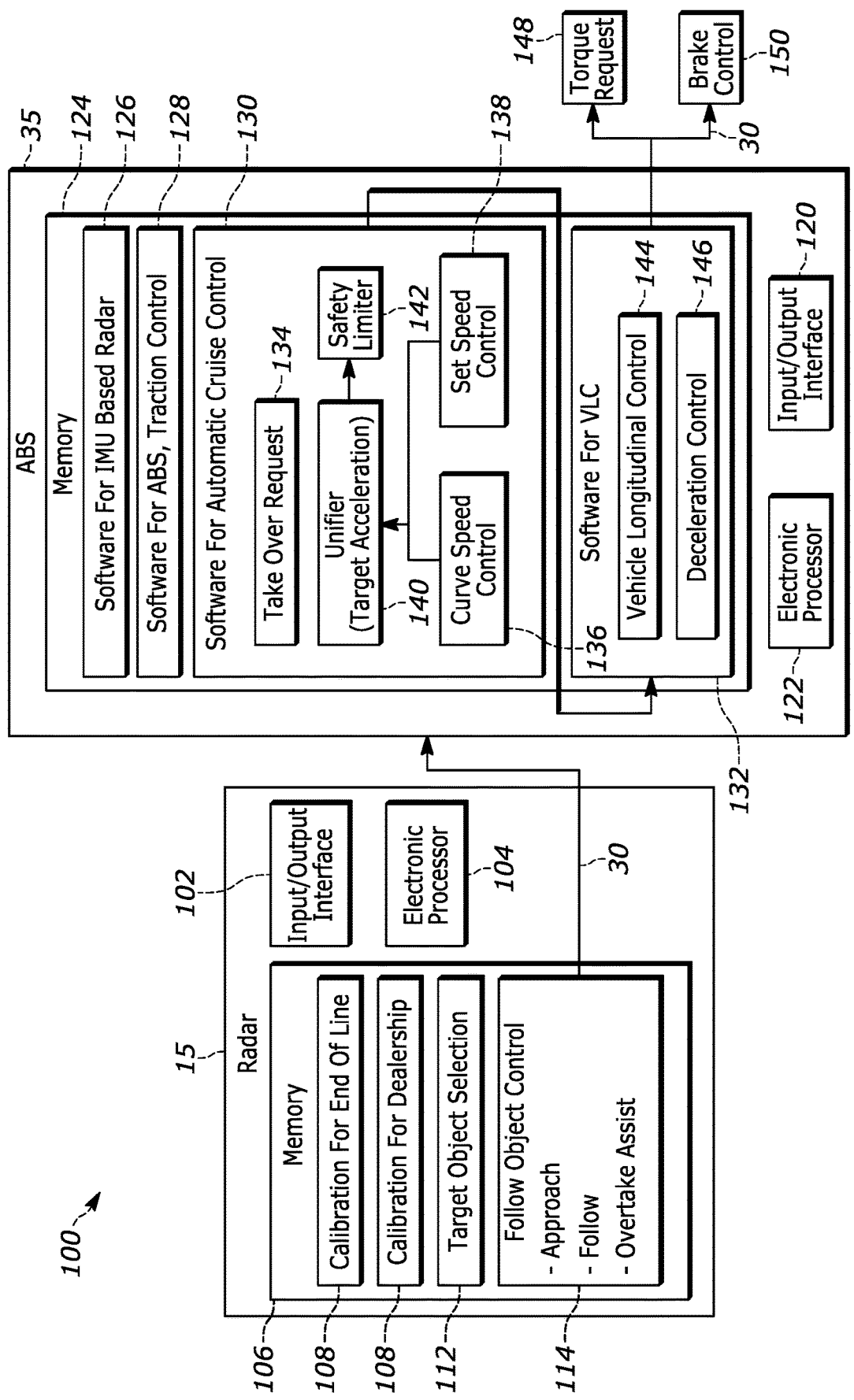
FIG. 2 is a block diagram of a system of automatic cruise control for a motorcycle, according to some aspects.

FIG. 2 is a block diagram of an example automatic cruise control system 100 for a motorcycle in accordance with some aspects. In the example shown, the automatic cruise control system 100 includes a radar 15, vehicle CAN bus 30, and ABS controller 35. In the example shown, radar 15 includes an input/output interface 102, an electronic processor 104, and memory 106. In some examples, electronic processor 104 is implemented as a microprocessor with separate memory, for example the memory 106. In other examples, the electronic processor 104 may be implemented as a microcontroller (with memory 106 on the same chip). In other examples, the electronic processor 104 may be implemented using multiple processors. In addition, the electronic processor 104 may be implemented partially or entirely as, for example, a field-programmable gate array (FPGA), an applications specific integrated circuit (ASIC), and the like and the memory 106 may not be needed or be modified accordingly. In some examples detailed herein, the memory 106 includes non-transitory, computer-readable memory that stores instructions that are received and executed by the electronic processor 104 to carry out method described herein including methods of road surface detection. The memory 106 may include, for example, a program storage area and a data storage area. The program storage area and the data storage area may include combinations of different types of memory, for example read-only memory and random-access memory. The input/output interface 102 may include one or more input mechanisms and one or more output mechanisms (for example, general-purpose input/outputs (GPIOs), a controller area network bus (CAN) bus interface, analog inputs digital inputs, and the like).

Stored within memory 106 is software for calibration, for example calibration for end of line 108 (for example, at a vehicle manufacturing facility) and calibration for dealership 110 (for example, by a technician prior to consumer purchase of a vehicle). In some examples, other calibration software or calibration parameters are stored within memory 106. Memory 106 also stores software for target object selection 112 and software for follow object control 114, also referred to as FOC. The software for follow object control 114 includes functions for controlling the approach, follow, and overtake assist of an object detected by the radar 15. In some examples, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

The radar 15 is configured to receive signals or messages from the vehicle CAN bus 30 via the input/output interface 102. For example, in some instances, the radar 15 receives signals for example rider selection, motorcycle speed, engine information, inertial measurement information, or button signals. Radar 15 is also configured to output signals from the input/output interface 102 to the vehicle CAN bus 30. For example, in some instances, radar 15 is configured to output warning/indication signals, acceleration request signals, or the like.

In some examples, the radar 15 is configured to generate sensor data or messages, for example sensor data associated with an object detected by the radar 15. The radar 15 uses information from its sensing components and motorcycle speed to calculate a time to collision. In one example, the calculation is a minimum amount of time before the motorcycle and the object detected by the radar 15 collide. In some instances, the radar 15 is configured calculate a cancellation condition to the overtake request independent of the push button signal characteristics. For example, a cancellation condition may be a time to collision that is less than a calibrated maximum time parameter setting. In another example, the cancellation condition is the duration of the overtake maneuver that has exceeded a calibrated maximum time parameter setting.

The ABS controller 35 includes an input/output interface 120, an electronic processor 122, and memory 124. Stored within memory 124 is software, for example IMU based radar software 126, ABS and traction control software 128, automatic cruise control software 130, and vehicle longitudinal control (VLC) software 132. The automatic cruise control software 130 is includes take over request 134, which includes a message given to the rider. For example, take over request 134 may include a message to the rider that they must take control of the motorcycle in order to avoid a collision or stall situation. Automatic cruise control software 130 contains algorithms for curve speed control 136 (CSC) and set speed control 138 (SSC). In some examples, the automatic cruise control software 130 includes additional control algorithms. Curve speed control 136 and set speed control 138 acceleration requests are monitored by unifier 140, also referred to as target acceleration unifier 140. For instance, in some examples, unifier 140 uses the curve speed control 136 and set speed control 138 to regulate motorcycle speed. Unifier 140 also arbitrates a follow object acceleration. For example, unifier 140 may receive requests from the follow object control 114, curve speed control 136, and/or set speed control 138, and arbitrate which request to honor. The automatic cruise control software 130 also contains a safety limiter 142.

The automatic cruise control software 130 provides information with the VLC software 132. The VLC software 132 includes vehicle longitudinal control 144 and deceleration control 146 algorithms. In some examples, vehicle longitudinal control 144 and deceleration control 146 algorithms are used by the VLC software 132 to provide the motorcycle engine and braking system with acceleration and deceleration requests. For instance, in some examples, the VLC software 132 requests a positive acceleration, such as torque request 148, to accelerate the motorcycle. In other instances, the VLC software 132 requests a negative acceleration, also referred to as break request 150, to decelerate the motorcycle. In these examples, the torque request 148 is communicated to and honored by the engine control unit 55. Negative acceleration requests are achieved by a combination off-throttle engine braking/natural deceleration and system braking by the ABS brake actuator 65. In other examples, the torque request 148 and the brake request 150 are used by other motorcycle systems.

Figure 3:
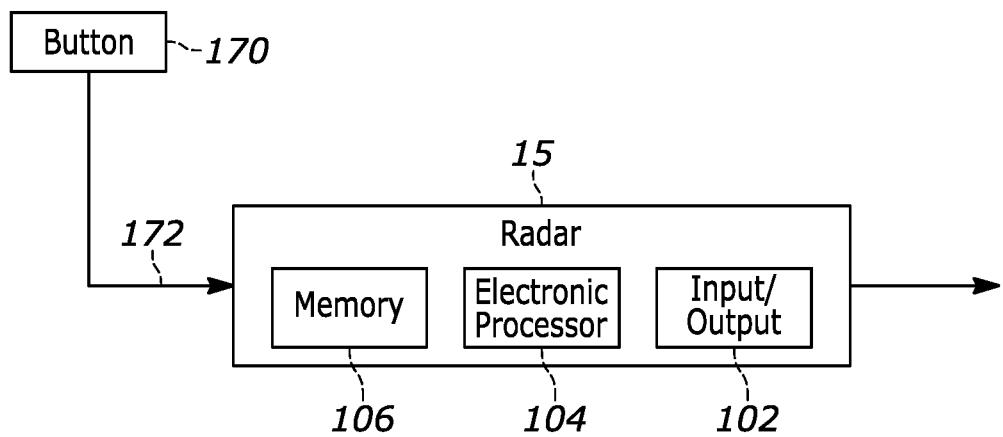
FIG. 3 is a block diagram of a system of automatic cruise control for a motorcycle, according to some aspects.

FIG. 3 is a block diagram of a system of automatic cruise control system 100 for a motorcycle, according to some aspects. The system includes radar 15, including the input/output interface 102, electronic processor 104, and memory 106 as previously described. As was also previously described, the radar 15 is connected to the vehicle CAN bus 30 and is configured to send and receive signals or messages over the vehicle CAN bus 30. The system 100 also includes a button 170. Button 170 is, for example, a switch, lever, actuator, or another type of input device. In some instances, the button 170 is a left turn indicator button and configured to be mounted on a handlebar of a motorcycle. In some instances, button 170 connects directly to radar 15. In other instances, button 170 indirectly connects to radar 15, for example through another controller. Button 170 is configured to generate a signal 172. In some instances, signal 172 is a dedicated overtake request signal. In other instances, signal 172 may be a different signal but can be indicative of an overtake request if certain signal characteristics are met. For instance, in some examples, data indicative of an overtake request is a button press duration greater than or equal to 2 seconds. When the radar 15 determines that the signal is an overtake request, the radar 15 momentarily increases the acceleration request to a value greater than that which is necessary to maintain the current prescribed time gap. This is done in order to facilitate overtaking the vehicle ahead of the motorcycle.

Figure 4:
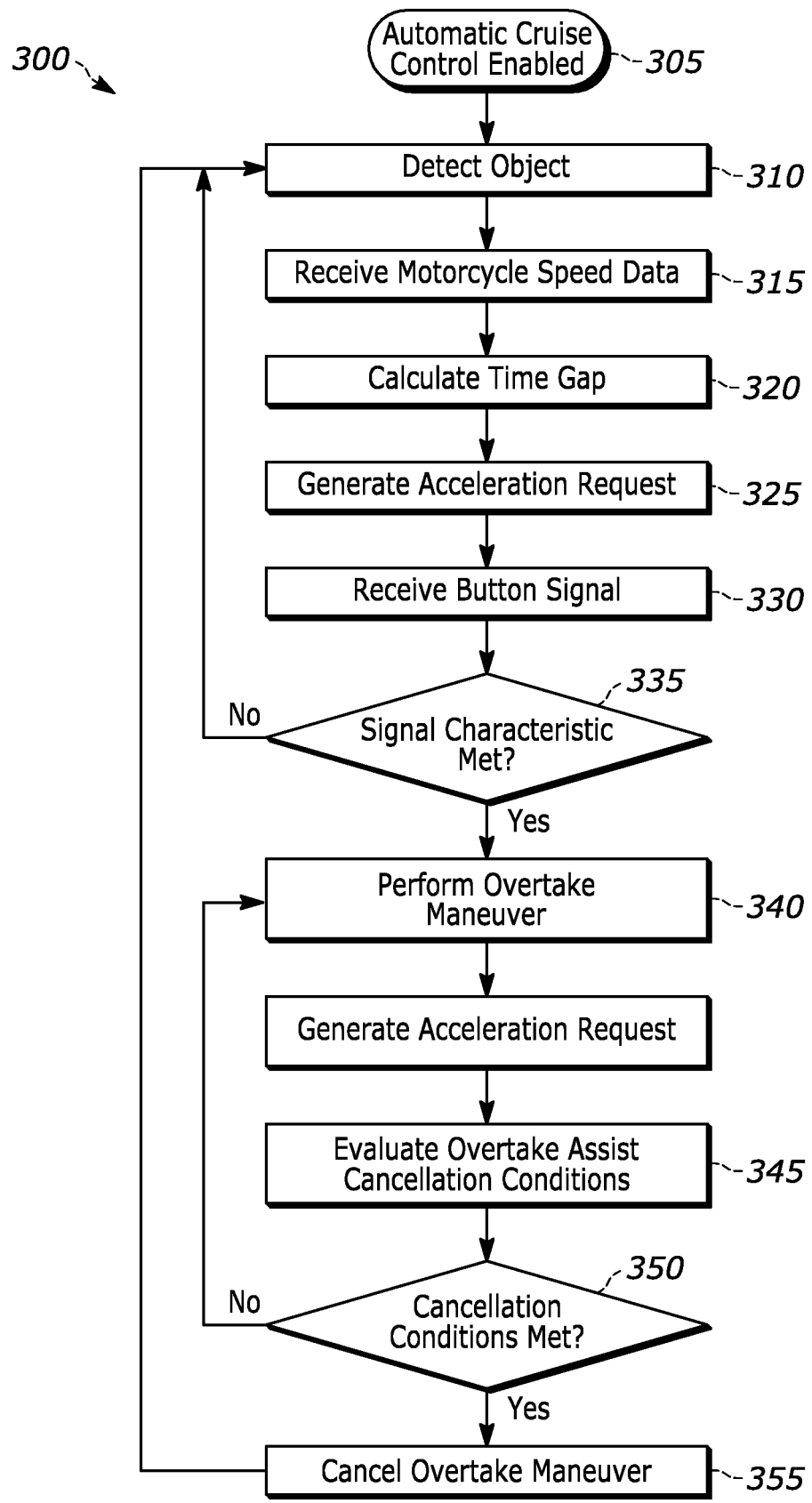
FIG. 4 is a flow chart of a process of overtake for an automatic cruise control for a motorcycle, according to some aspects.

FIG. 4 is a block diagram of an example process of overtake for an automatic cruise control for a motorcycle. The process 300 begins at STEP 305 in which automatic cruise control is enable. In STEP 310 radar 15 detects an object in front of the vehicle and generates sensor data. In STEP 315, the radar 15 receives a measured (or otherwise determined) motorcycle speed. In some examples, the radar 15 is responsible for determining a motorcycle speed. For example, in some instances, the radar 15 receives sensor data indicating speed over ground using stationary objects detected by the radar 15. The process 300 proceeds to STEP 320, where the radar 15 calculates a current time gap to the detected object in front of the vehicle based upon the sensor data generated in STEP 310 and the measured motorcycle speed received in STEP 315. For example, for a given velocity and follow distance, the time gap is the amount of time for the motorcycle to travel the current object follow distance at the motorcycle's current speed. The process 300 then proceeds to STEP 325 where the radar 15 calculates and generates an acceleration request signal. In some instances, this acceleration request signal is an automatic cruise control acceleration of the motorcycle. The automatic cruise control acceleration of the motorcycle is regulated to maintain a time gap between the motorcycle and an object detected by radar 15. The process 300 then proceeds to STEP 330 where the radar 15 receives a signal from a button, for example signal 172 from button 170.

The process 300 continues to STEP 335, where the radar 15 determines whether the received signal contains at least one predetermined characteristic indicative of an overtake request. As previously described, in some instances, the signal characteristic is a signal duration being greater than or equal to 2 seconds (sometimes referred to as a "long button press"). If, in STEP 335, the radar 15 determines that the signal does not contain at least one signal characteristic indicative of an overtake request signal, the process 300 returns to STEP 310. If, in STEP 335, the radar 15 determines that the signal does contain at least one signal characteristic indicative of an overtake request signal, the process 300 continues to STEP 340. At STEP 340, the radar 15 performs an overtake maneuver. In some instances, the overtake maneuver is performed by the radar 15 by momentarily increasing the follow object control acceleration request being sent to the ABS controller 35 to allow for smooth overtaking of the detected object. The overtake acceleration is regulated to reduce the spatial distance between the motorcycle and an object detected by the radar 15 such that a rider of the motorcycle overtakes the detected object.

The process 300 then proceeds to STEP 345, where overtake cancellation conditions are evaluated. In some instances, the overtake cancellation condition is a calibrated maximum time parameter setting. For example, the radar 15 determines that an overtake cancellation condition has been met if the duration of the overtake maneuver exceeds a calibrated maximum time parameter setting. In some instances, the overtake cancellation condition is a time to collision less than a predetermined time to collision threshold. For example, radar 15 determines than an overtake cancellation condition has been met if the calculated time to collision is falls below a calibrated maximum time parameter setting. In some instances, the overtake cancellation condition includes a rider of the motorcycle manually cancelling the overtake maneuver. If, in STEP 350, the radar 15 determines that the overtake cancellation conditions have not been met, the process 300 returns to STEP 340 and the radar 15 continues to reduce following distance. If, in STEP 350, the radar 15 determines that one of the overtake cancellation conditions has been met, the process 300 proceeds to STEP 355, where the radar 15 reduces the acceleration request back to that which is determined necessary by the follow object control in order to achieve and maintain the prescribed time gap in a normal ACC following state. The process 300 then returns to STEP 310. It should be understood that process 300 is one example, in certain instances, not all steps are required, and the order of the steps may vary from the order described.

Accordingly, various implementations of the systems and methods described herein provide, among other things, techniques for the performance of an overtake maneuver by motorcycle. Other features and advantages of the invention are set forth in the following claims.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

What is claimed is:

1. A radar system for a motorcycle, the system comprising:
    a radar configured to detect an object in front of the motorcycle;
    a button for the motorcycle configured to generate a signal; and
    an electronic processor configured to:
        receive sensor data from the radar,
        determine a speed of the detected object using the sensor data,
        receive a speed of the motorcycle,
        receive the signal from the button of the motorcycle,
        determine that the signal is an overtake request based upon a characteristic of the signal;
        calculate a duration of an overtake maneuver;
        determine an overtake cancellation condition;
    wherein the electronic processor performs the overtake maneuver by increasing a follow object control acceleration request value in response to the overtake request;
    wherein the overtake cancellation condition is the duration of the overtake maneuver that exceeds a preset calibrated maximum time parameter setting; and
    wherein, in response to the determined overtake cancelation condition, the electronic processor cancels the overtake maneuver.

2. The system of claim 1, wherein the button of the motorcycle is a left turn indicator button.

3. The system of claim 1, wherein the button of the motorcycle is a dedicated overtake button.

4. The system of claim 1, wherein the characteristic of the signal is a duration greater than or equal to 2 seconds.

5. The system of claim 1, wherein the electronic processor is further configured to calculate a time to collision based upon the speed of the motorcycle and an object in front of the motorcycle, and wherein the overtake cancellation condition is the time to collision that is less than a time to collision threshold.

6. The system of claim 1, wherein the electronic processor further configured to:
    receive a curve speed control acceleration request,
    receive a set speed control acceleration request,
    calculate a curve speed control based upon the curve speed control acceleration request,
    calculate a set speed control based upon the set speed control acceleration request, and
    control an acceleration of the motorcycle based upon the curve speed control and the set speed control.

7. The system of claim 6, wherein the electronic processor is further configured to:
    receive a follow object control acceleration request,
    calculate a follow object control based upon the follow object control acceleration request, and
    arbitrate the curve speed control, the set speed control, and the follow object control to control the acceleration of the motorcycle.

8. The system of claim 1, wherein the electronic processor further configured to:
    calculate a time gap to the detected object based upon the speed of the detected object and the speed of the motorcycle, and
    control an acceleration of the motorcycle to maintain the time gap,
    wherein in response to the determination that the signal is an overtake request, the electronic processor controls the acceleration of the motorcycle to reduce the time gap, and
    wherein response to the overtake cancelation condition, the electronic processor controls the acceleration of the motorcycle to increase the time gap.

9. A method of overtake for an automatic cruise control of a motorcycle, the method comprising:
    detecting, by a radar, an object in front of the motorcycle;
    receiving, a speed of the motorcycle;
    receiving, by the radar, a signal sent by a button of the motorcycle,
    determining, by the radar, that the signal is an overtake request;
    calculating, by the radar, a duration of an overtake maneuver;
    performing, by the radar, the overtake maneuver by increasing a follow object control acceleration request value;
    determining, by the radar, an overtake cancellation condition, wherein the overtake cancellation condition is the duration of the overtake maneuver that exceeds a preset calibrated maximum time parameter setting; and
    canceling the performance of the overtake maneuver, by the radar, based upon the determined overtake cancellation condition.

10. The method of claim 9, wherein the radar determines an overtake request based upon the signal having a duration greater than or equal to 2 seconds.

11. The method of claim 9, wherein the radar is further configured to determine that the detected object is a vehicle.

12. The method of claim 9, wherein the radar is further configured to generate sensor data to determine the speed of the detected object.

13. The method of claim 9, wherein the radar is further configured to calculate a time to collision based upon the speed of the motorcycle and the object in front of the motorcycle, and wherein the overtake cancellation condition is the time to collision that is less than a time to collision threshold.

14. The method of claim 9, the method further comprising:
receiving, by the radar, a curve speed control acceleration request,
receiving, by the radar, a set speed control acceleration request,
calculating, by the radar, a curve speed control based upon the curve speed control acceleration request,
calculating, by the radar, a set speed control based upon the set speed control acceleration request, and
controlling, by the radar, an acceleration of the motorcycle based upon the curve speed control and the set speed control.

15. The method of claim 14, the method further comprising:
receiving, by the radar, a follow object control acceleration request,
calculating, by the radar, a follow object control based upon the follow object control acceleration request, and
arbitrating, by the radar, the curve speed control, the set speed control, and the follow object control to control the acceleration of the motorcycle.

16. The method of claim 9, the method further comprising:
calculating, by the radar, a time gap to the detected object based upon the speed of the detected object and the speed of the motorcycle, and
controlling, by the radar, an acceleration of the motorcycle to maintain the time gap,
wherein in response to the determination that the signal is an overtake request, controlling, by the radar, the acceleration of the motorcycle to reduce the time gap, and
wherein response to the overtake cancelation condition, controlling, by the radar, the acceleration of the motorcycle to increase the time gap.

17. A radar system for a motorcycle, the system comprising:
a radar configured to detect vehicle in front of the motorcycle and to generate sensor data;
a left turn indicator button for the motorcycle configured to generate a signal; and
an electronic processor configured to:
receive sensor data from the radar,
determine a speed of the detected vehicle using the sensor data,
receive a speed of the motorcycle,
receive the signal from the left turn indicator button of the motorcycle,
determine that the signal is an overtake request based upon the signal having a duration greater than or equal to 2 seconds;
calculate a duration of an overtake maneuver;
determine an overtake cancellation condition;
wherein the electronic processor performs the overtake maneuver by increasing a follow object control acceleration request value in response to the overtake request;
wherein the overtake cancellation condition is the duration of the overtake maneuver that exceeds a preset calibrated maximum time parameter setting; and
wherein, in response to the determined overtake cancelation condition, the electronic processor cancels the overtake maneuver.

18. The system of claim 17, wherein the electronic processor is further configured to calculate a time to collision based upon the speed of the motorcycle and an object in front of the motorcycle, and wherein the overtake cancellation condition is a time to collision that is less than a time to collision threshold.

19. The system of claim 17, wherein the electronic processor further configured to:
receive a curve speed control acceleration request,
receive a set speed control acceleration request,
calculate a curve speed control based upon the curve speed control acceleration request,
calculate a set speed control based upon the set speed control acceleration request,
calculate a time gap to the detected object based upon the speed of the detected object and the speed of the motorcycle, and
control an acceleration of the motorcycle based upon the curve speed control and the set speed control to maintain the time gap,
wherein in response to the determination that the signal is an overtake request, the electronic processor controls the acceleration of the motorcycle based upon the curve speed control and the set speed control to reduce the time gap, and
wherein response to the overtake cancelation condition, the electronic processor controls the acceleration of the motorcycle based upon the curve speed control and the set speed control to increase the time gap.

20. The system of claim 19, wherein the electronic processor is further configured to:
receive a follow object control acceleration request,
calculate a follow object control based upon the follow object control acceleration request, and
arbitrate the curve speed control, the set speed control, and the follow object control to control the acceleration of the motorcycle.

* * * * *